United States Patent
Zhang et al.

(10) Patent No.: US 12,283,058 B1
(45) Date of Patent: Apr. 22, 2025

(54) METHOD AND SYSTEM FOR ANALYZING GLOBAL AVERAGE GRAYSCALE CHANGE OF TUNDISH INK TRACING EXPERIMENT

(71) Applicants: North China University of Technology, Beijing (CN); University of Science and Technology Beijing, Beijing (CN)

(72) Inventors: Lifeng Zhang, Beijing (CN); Haojian Duan, Beijing (CN); Dinghan Li, Beijing (CN); Yuexin Zhang, Beijing (CN); Wei Chen, Beijing (CN); Ying Ren, Beijing (CN)

(73) Assignees: North China University of Technology, Beijing (CN); University of Science and Technology Beijing, Beijing (CN)

( * ) Notice: Subject to any disclaimer, the term of this patent is extended or adjusted under 35 U.S.C. 154(b) by 0 days.

(21) Appl. No.: 18/785,108

(22) Filed: Jul. 26, 2024

(30) Foreign Application Priority Data

Sep. 28, 2023 (CN) .......................... 202311268116.9

(51) Int. Cl.
*G06T 7/246* (2017.01)
*G01N 11/02* (2006.01)
(Continued)

(52) U.S. Cl.
CPC .............. *G06T 7/246* (2017.01); *G01N 11/02* (2013.01); *G06T 7/62* (2017.01); *G06T 7/64* (2017.01);
(Continued)

(58) Field of Classification Search
CPC .. G06T 7/246; G06T 7/64; G06T 7/62; G06T 7/90; G06T 2207/10016; G06T 2207/10024; G06T 2207/30136
See application file for complete search history.

(56) References Cited

U.S. PATENT DOCUMENTS

| 5,882,577 A * | 3/1999 | Zacharias ............ B22D 41/003 |
| | | 266/275 |
| 2005/0175232 A1* | 8/2005 | Ichimura ................ G01N 21/88 |
| | | 382/141 |

(Continued)

FOREIGN PATENT DOCUMENTS

| CN | 101596581 A | 12/2009 |
| CN | 104690243 A | 6/2015 |

(Continued)

OTHER PUBLICATIONS

Shan Qinglin et al., "Water modeling on the transport phenomenon during bottom gas injection of a 210 t ladle," Steelmaking, Date of issue: Jun. 30, 2023, pp. 35-43, vol. 39, No. 3 (abstract translated). Related claims: 1-10.

(Continued)

*Primary Examiner* — Mohamed A. Wasel
(74) *Attorney, Agent, or Firm* — Pilloff Passino & Cosenza LLP; Rachel Pilloff; Sean Passino

(57) ABSTRACT

A method analyzes global average grayscale change of tundish ink tracing experiment. The method includes the following steps: building a water model based on a prototype size and production parameters of a tundish; carrying out experiments by using the water model to obtain a video file of the ink tracing; processing the video file and extracting a characteristic curve of a global average grayscale changing with the time; analyzing the characteristic curve, and extracting a global peak grayscale time, a global tracer residual volume and a global emptying time as indicators for evaluating a tundish structure and flow characteristics of the tundish structure.

3 Claims, 3 Drawing Sheets

(51) Int. Cl.
   *G06T 7/62*   (2017.01)
   *G06T 7/64*   (2017.01)
   *G06T 7/90*   (2017.01)
(52) U.S. Cl.
   CPC ...... *G06T 7/90* (2017.01); *G06T 2207/10016* (2013.01); *G06T 2207/10024* (2013.01); *G06T 2207/30136* (2013.01)

(56) References Cited

U.S. PATENT DOCUMENTS

| | | | | |
|---|---|---|---|---|
| 2011/0062193 | A1* | 3/2011 | Sadano | B22D 41/28 222/590 |
| 2012/0253498 | A1* | 10/2012 | Tommatsu | B22D 11/161 700/109 |
| 2018/0064851 | A1 | 3/2018 | Alsberg et al. | |
| 2021/0016346 | A1* | 1/2021 | Liu | B22D 43/004 |
| 2023/0295780 | A1* | 9/2023 | Li | C21C 7/076 420/83 |
| 2023/0347406 | A1* | 11/2023 | Niitsuma | B22D 11/10 |

FOREIGN PATENT DOCUMENTS

| | | |
|---|---|---|
| CN | 110057864 A | 7/2019 |
| CN | 113138141 A | 7/2021 |
| CN | 114378266 A | 4/2022 |
| CN | 115392146 A | 11/2022 |
| CN | 116399867 A | 7/2023 |
| JP | H0275456 A | 3/1990 |
| JP | 2016186453 A | 10/2016 |
| JP | 2017030051 A | 2/2017 |
| JP | 2017077563 A | 4/2017 |
| JP | 2017177178 A | 10/2017 |
| KR | 20220130363 A | 9/2022 |

OTHER PUBLICATIONS

Li Yuqian et al., "Analysis method of outflow percentage of data of water model of tundishes," Chinese journal of process engineering, Date of issue: Jan. 21, 2022, pp. 1,447-1,457, vol. 22, No. 11 (abstract translated). Related claims: 1-10.

Akriti Nigam et al., "Novel Image Analysis-BasedMethod for ResidenceTime Distribution Analysisin SteelmakingTundish," Trans Indian Inst Met, Date of issue: Jan. 1, 2021, pp. 243-254, 74,2. Related claims: 1-10.

Ma Haitao et al., "Flow Behavior of Molten Steel in Tundish Using RTD Curve," Foundry Technology, Date of issue: Dec. 18, 2016, pp. 113-116, No. 12 (abstract translated). Related claims: 1-6.

Kong Zhang-Qing et al., "Study on the Water Modeling to Optimize the Tundish inside Shape of 2-stand Billet Tundish," Journal of Anhui University of Technology (Natural Science Edition), Date of issue: Jan. 15, 2011, pp. 7-10, No. 01 (abstract translated). Related claims: 1-6.

Bi Xuegong et al., "Numerical simulation of design optimization of a continuouscasting tundish based on RTD curve," Journal of Wuhan University of Science and Technology, Date of issue: Aug. 15, 2010, pp. 343-346, vol. 33, No. 04 (abstract translated). Related claims: 1-6.

First Office Action for China Application No. 202311268116.9, mailed Feb. 7, 2024.

Notification to Grant Patent for China Application No. 202311268116. 9, mailed Mar. 12, 2024.

First Search Report for China Application No. 202311268116.9, dated Feb. 1, 2024.

Supplementary Search Report for China Application No. 202311268116. 9, dated Mar. 1, 2024.

* cited by examiner

METHOD AND SYSTEM FOR ANALYZING GLOBAL AVERAGE GRAYSCALE CHANGE OF TUNDISH INK TRACING EXPERIMENT

CROSS-REFERENCE TO RELATED APPLICATIONS

This application claims priority to Chinese Patent Application No. 202311268116.9, filed on Sep. 28, 2023, the contents of which are hereby incorporated by reference.

TECHNICAL FIELD

The application belongs to the technical field of ironmaking and steelmaking, and in particular relates to a method and a system for analyzing global average grayscale change of tundish ink tracing experiment.

BACKGROUND

Tundish is a metallurgical container connecting molten steel refining and solidification, which plays an important role in the process of continuous casting, such as buffering, shunting, homogenizing composition and temperature of the molten steel and removing inclusions. The effect of these metallurgical functions depends on the tundish structure and the corresponding flow characteristics. In order to produce high quality steel products, it is necessary to evaluate and optimize the flow characteristics in tundish. However, due to the limitation of production conditions, it is difficult for researchers to directly carry out the measurement during continuous casting, so physical simulation and mathematical simulation are often used.

Since the kinematic viscosity of the molten steel at steelmaking temperature is similar to that of the water at room temperature, the molten steel is often modeled by the water. Water models are built to analyze and discuss the fluid flow in the tundish. The commonly used physical simulation methods are as follows: measuring the residence time distribution (RTD) of fluid in the tundish by means of "stimulus-response"; directly measuring the speed of one or several planes in the tundish by a particle image velocimetry (PIV); and directly displaying the fluid flow in the tundish through the ink tracing experiment. The experimental principle of the ink tracing experiment is that the colored ink is added to the inlet of the tundish, and then the aqueous solution mixed with ink will move with the flow of the water, and thus the flow field in the tundish is displayed. This method has the advantages of low experimental cost, convenient operation, intuition, and so on. However, the existing discussion of ink tracing experiment only explains the fluid flow in the tundish qualitatively. How to further analyze the data obtained by ink tracing experiment and obtain the evaluation indicator for quantitatively evaluating the flow state in the tundish is necessary and of great research significance.

In the ink tracing experiment, the global color change of the aqueous solution in the tundish is clearly observed, and the global color change reflects the flow and mixing process of the fluid in the tundish, but the previously reported ink tracing experiment of the tundish only explains the flow state of the fluid in the tundish in a qualitative way. Therefore, the application provides a method for analyzing global average grayscale change of tundish ink tracing experiment.

SUMMARY

Aiming at the shortcomings of the prior art, the application provides a method and a system for analyzing the global average grayscale change of the tundish ink tracing experiment. Taking the video result of the ink tracing experiment as the research object, the characteristic curve of the global average grayscale changing with the time is extracted by analyzing the global grayscale change of the solution in the tundish, and then the characteristic indicators for evaluating the flow and mixing situation in the tundish are obtained.

In order to achieve the above objectives, the present application provides the following scheme.

A method for analyzing the global average grayscale change of tundish ink tracing experiment, including following steps:

building a water model based on a prototype size and production parameters of a tundish;

carrying out experiments by using the water model to obtain a video file of the ink tracing;

processing the video file and extracting a characteristic curve of a global average grayscale changing with the time;

analyzing the characteristic curve, and extracting a global peak grayscale time, a global tracer residual volume and a global emptying time as indicators for evaluating a tundish structure and flow characteristics of the tundish structure.

Optionally, a method for building the water model based on the prototype size and the production parameters of the tundish includes:

obtaining a nominal capacity of the tundish, and measuring or designing the prototype size of the tundish based on the nominal capacity;

determining a similarity ratio between the water model and the prototype according to experimental conditions; and reducing the prototype size in equal proportion based on the similarity ratio, and building the water model based on a reduced prototype size.

Optionally, a method for carrying out the experiments by using the water model to obtain the video file of the ink tracing includes:

adjusting the water flowrate at an inlet and an outlet of the water model to make the flow in the water model in a stable state;

placing the high-speed camera at a proper position in front of the water model, and placing a white strong light source at a side of the water model;

turning on the high-speed camera and the white strong light source, adjusting a shoot area and the shooting frame rate of the high-speed camera, and adjusting the white strong light source so that the white strong light source completely illuminates the shoot area;

quickly injecting ink with a preset volume at the inlet of the water model; and using the high-speed camera to shoot the flow and diffusion process of the ink in the water model to obtain the video file of the ink tracing.

Optionally, a process of processing the video file and extracting the characteristic curve of the global average grayscale changing with the time includes:

extracting pictures in the video file frame by frame, and sequentially saving each frame of the pictures as an image, and sequentially named as Image_00001, Image_00002, Image_00003 . . . , and all the images are saved in an image folder Image_File;

processing the extracted first frame image, painting the non-research area as pure white, and taking the remaining area as a research area, and simultaneously reading and recording positions of the research area and the non-research area through a computer program;

based on the read position of the non-research area, processing all the images in the image folder Image_File by the computer program, and painting the non-research areas of all the images pure white;

finding the first image with ink at the inlet from front to back in the image folder Image_File, and renamed as Im_00001, the image before the Im_00001 is an initial image, and renamed as Im_00000, and renaming images after Im_00001 as Im_00002, Im_00003 . . . , and deleting remaining images;

reading the RGB value of the Im_00000 image through the computer program, using RGB values of all the images in the image folder Image_File to subtract the RGB value of Im_00000 image to obtain new images, and saving all the new images in the image folder Post_File, being named as Post_00000, Post_00001, Post_00002, post_00003 . . . in turn;

based on the read position of the research area, reading and calculating the average grayscale value of the research area of each image in the image folder Post_File in turn by the computer program, and saving the average grayscale value in a Post_Gray array in turn;

based on the shooting frame rate of a high-speed camera, creating the characteristic curve of the global average grayscale changing with the time, where an abscissa is the time, obtained by converting from the shooting frame rate of the high-speed camera, and an ordinate is a normalized grayscale value, obtained by dividing each value in the Post_Gray array by a maximum value in the Post_Gray array.

Optionally, a process for analyzing the characteristic curve, and extracting the global peak grayscale time, the global tracer residual volume and the global emptying time as the indicators for evaluating the tundish structure and the flow characteristics of the tundish structure, including:

based on the characteristic curve of the global average grayscale changing with the time, obtaining the first moment with the normalized grayscale value of 1.00, meaning the time of the abscissa corresponding to the first time of 1.00 in the ordinate, and defining the time of the corresponding abscissa as the global peak grayscale time;

based on the characteristic curve of the global average grayscale changing with the time, obtaining the average grayscale value corresponding to 2 times of theoretical residence time, meaning the average grayscale value corresponding to 2 times the theoretical residence time in the abscissa, and defining the corresponding average grayscale value as the global tracer residual volume;

based on the characteristic curve of the global average grayscale changing with the time, obtaining the first moment with the normalized grayscale value of 0.05, meaning the time of the abscissa corresponding to the first time of 0.05 in the ordinate, and defining the time corresponding to the abscissa as the global emptying time; and using the global peak grayscale time, the global tracer residual volume and the global emptying time as the indicators for evaluating the tundish structure and the flow characteristics of the tundish structure.

The application also provides a system for analyzing global average grayscale change of tundish ink tracing experiment, including a model building module, a video file obtaining module, a characteristic curve extracting module and an evaluation indicator extracting module;

the model building module is used for building a water model based on a prototype size and production parameters of a tundish;

the video file obtaining module is used for carrying out experiments by using the water model to obtain a video file of the ink tracing;

the characteristic curve extracting module is used for processing the video file and extracting a characteristic curve of the global average grayscale changing with the time;

the evaluation indicator extracting module is used for analyzing the characteristic curve and extracting a global peak grayscale time, a global tracer residual volume and a global emptying time as indicators for evaluating a tundish structure and flow characteristics of the tundish structure.

Optionally, a process of building the water model based on the prototype size and the production parameters of the tundish includes:

obtaining a nominal capacity of the tundish, and measuring or designing the prototype size of the tundish based on the nominal capacity;

determining a similarity ratio between the water model and the prototype according to experimental conditions; and reducing the prototype size in equal proportion based on the similarity ratio, and building the water model based on a reduced prototype size.

Optionally, a process of carrying out the experiments by using the water model to obtain the video file of the ink tracing includes:

adjusting the water flowrate at an inlet and an outlet of the water model to make the flow in the water model in a stable state;

placing the high-speed camera at a proper position in front of the water model, and placing a white strong light source at a side of the water model;

turning on the high-speed camera and the white strong light source, adjusting a shoot area and the shooting frame rate of the high-speed camera, and adjusting the white strong light source so that the white strong light source completely illuminates the shoot area;

quickly injecting ink with a preset volume at the inlet of the water model; and using the high-speed camera to shoot the flow and diffusion process of the ink in the water model to obtain the video file of the ink tracing.

Optionally, a process for processing the video file and extracting the characteristic curve of the global average grayscale changing with the time includes:

extracting pictures in the video file frame by frame, and sequentially saving each frame of the pictures as an image, and sequentially named as Image_00001, Image_00002, Image_00003 . . . , and all the images are saved in an image folder Image_File;

processing the extracted first frame image, painting the non-research area as pure white, and taking the remaining area as a research area, and simultaneously reading and recording positions of the research area and the non-research area through a computer program;

based on the read position of the non-research area, processing all the images in the image folder Image_File by the computer program, and painting the non-research areas of all the images pure white;

finding the first image with ink at the inlet from front to back in the image folder Image_File, and renamed as Im_00001, the image before the Im_00001 is an initial image, and renamed as Im_00000, and renaming images after Im_00001 as Im_00002, Im_00003 . . . , and deleting remaining images;

reading the RGB value of the Im_00000 image through the computer program, using RGB values of all the images in the image folder Image_File to subtract the RGB value of Im_00000 image to obtain new images, and saving all the new images in the image folder Post_File, being named as Post_00000, Post_00001, Post_00002, post_00003 . . . in turn;

based on the read position of the research area, reading and calculating the average grayscale value of the research area of each image in the image folder Post_File in turn by the computer program, and saving the average grayscale value in a Post_Gray array in turn;

based on the shooting frame rate of a high-speed camera, creating the characteristic curve of the global average grayscale changing with the time, where an abscissa is the time, obtained by converting from the shooting frame rate of the high-speed camera, and an ordinate is a normalized grayscale value, obtained by dividing each value in the Post_Gray array by a maximum value in the Post_Gray array.

Optionally, a process for analyzing the characteristic curve, and extracting the global peak grayscale time, the global tracer residual volume and the global emptying time as the indicators for evaluating the tundish structure and the flow characteristics of the tundish structure, including:

based on the characteristic curve of the global average grayscale changing with the time, obtaining the first moment with the normalized grayscale value of 1.00, meaning the time of the abscissa corresponding to the first time of 1.00 in the ordinate, and defining the time of the corresponding abscissa as the global peak grayscale time;

based on the characteristic curve of the global average grayscale changing with the time, obtaining the average grayscale value corresponding to 2 times of theoretical residence time, meaning the average grayscale value corresponding to 2 times the theoretical residence time in the abscissa, and defining the corresponding average grayscale value as the global tracer residual volume;

based on the characteristic curve of the global average grayscale changing with the time, obtaining the first moment with the normalized grayscale value of 0.05, meaning the time of the abscissa corresponding to the first time of 0.05 in the ordinate, and defining the time corresponding to the abscissa as the global emptying time; and using the global peak grayscale time, the global tracer residual volume and the global emptying time as the indicators for evaluating the tundish structure and the flow characteristics of the tundish structure.

Compared with the prior art, the application has the following beneficial effects.

According to the application, the video obtained by the tundish ink tracing experiment is subjected to image processing, and the characteristic curve of the global average grayscale changing with the time in the tundish ink tracing experiment is extracted, thereby obtaining the indicators for quantitatively evaluating the tundish structure and the flow characteristics, namely the global peak grayscale time, the global tracer residual volume and the global emptying time. The existing tundish ink tracing experiment mainly discusses the flow direction of the fluid in the tundish from a qualitative point of view. However, on the basis of the qualitative analysis of the traditional tundish ink tracing experiment, the application further mines the data of the shot video, and takes the global color change of the aqueous solution in the tundish as the research point, thereby obtaining the indicators for quantitatively evaluating the fluid flow and mixing characteristics in the tundish, and providing a theoretical basis for optimizing the metallurgical process and parameters of the tundish.

BRIEF DESCRIPTION OF THE DRAWINGS

In order to explain the technical scheme of the present application more clearly, the drawings needed in the embodiments are briefly introduced below. Obviously, the drawings in the following description are only some embodiments of the present application. For ordinary people in the field, other drawings may be obtained according to these drawings without paying creative labor.

DETAILED DESCRIPTION OF THE EMBODIMENTS

In the following, the technical scheme in the embodiment of the application will be clearly and completely described with reference to the attached drawings. Obviously, the described embodiment is only a part of the embodiment of the application, but not the whole embodiment. Based on the embodiments in the present application, all other embodiments obtained by ordinary technicians in the field without creative labor belong to the scope of protection of the present application.

In order to make the above objects, features and advantages of the present application more obvious and easier to understand, the present application will be further described in detail with the attached drawings and specific implementation methods.

Embodiment 1

Figure 1:
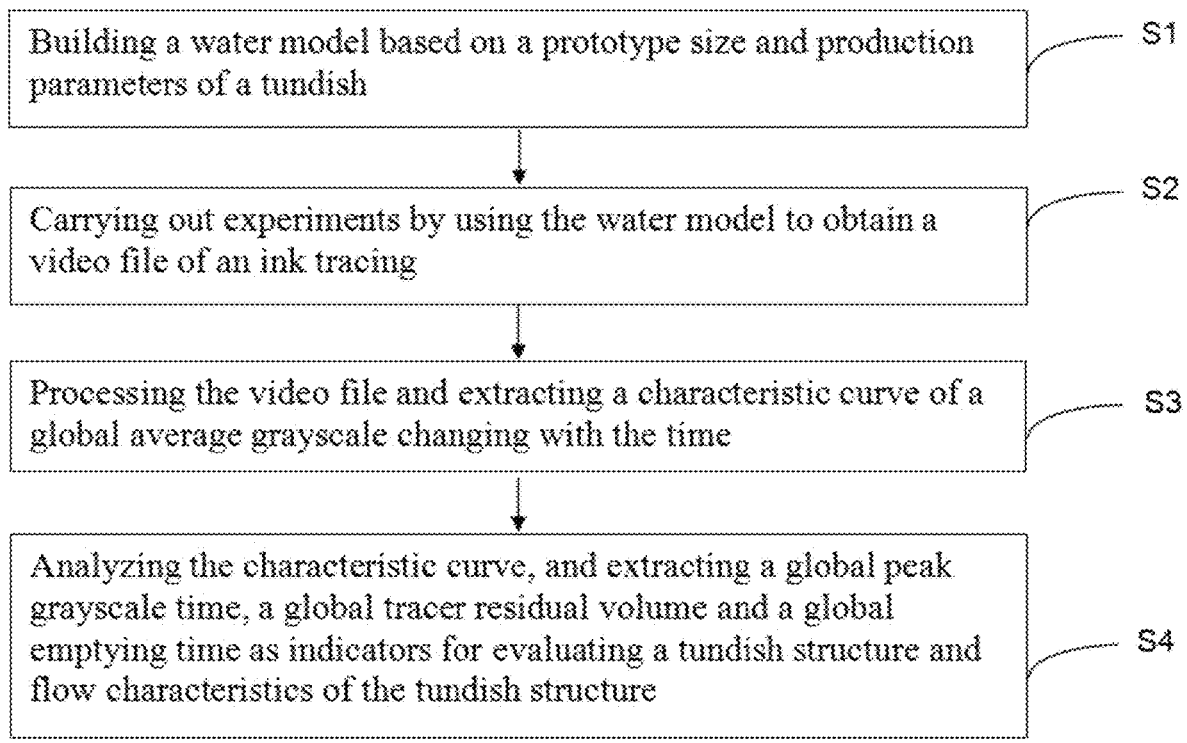
FIG. 1 is a flow chart of a research method based on analyzing the global average grayscale change of tundish ink tracing experiment.

As shown in FIG. 1, the research method of the application based on analyzing the global average grayscale change of the tundish ink tracing experiment specifically includes the following steps:

S1): building a water model based on a prototype size and production parameters of a tundish;

S2): carrying out experiments by using the water model to obtain a video file of the ink tracing;

S3): processing the video file and extracting a characteristic curve of a global average grayscale changing with the time; and S4): analyzing the characteristic curve, and extracting a global peak grayscale time, a global tracer residual volume and a global emptying time as indicators for evaluating a tundish structure and flow characteristics of the tundish structure.

The specific steps of S1) are as follows:

S1.1) based on the tundish studied, the nominal capacity is determined, the key sizes are measured or designed, which are the prototype sizes, including the length, width and depth of tundish, the inner and outer diameters of long nozzle (i.e. inlet), the immersion depth of long nozzle, the outlet diameter of tundish, the diameter of stopper rod, the structure and size of turbulence inhibitor, the presence or absence of dam and baffle (if any, the structure and size), and the height of molten steel during steady casting (i.e. liquid level);

S1.2) the flowrate of the molten steel at the outlet of the prototype tundish is calculated based on the section size of the slab and casting speed;

S1.3) the similarity ratio is determined according to the experimental conditions, and the ratio of the water model to the prototype size is usually between 1/5 and 1/1;

S1.4) a water model is built by reducing the prototype size obtained in S1.1) in equal proportion based on the similarity ratio determined in S1.3), and the water model will be made of transparent plexiglass;

S1.5) according to the similarity principle, when designing the tundish water model, the Froude number of the water model and the prototype are equal. According to the similarity ratio determined in S1.3), the flowrate of the molten steel at the outlet of the prototype tundish obtained in S1.2) is substituted into the Froude number, and the water flowrate at the outlet of the water model is obtained;

S1.6) the theoretical residence time of the water model is obtained according to the calculation of the size of the water model and the water flowrate at the outlet of the water model.

The specific steps of S2) are as follows:

S2.1) the water model experiment is carried out based on the water model built in S1). First, the outlet of the water model is closed, the inlet is opened, and colorless tap water is injected into the water model tundish. When the liquid level is approaching the liquid level corresponding to steady casting, the outlet of the water model tundish is opened and the water flowrate at the outlet is adjusted to the water flowrate obtained in S1.5); then, through feedback adjustment, the water flowrate at the inlet is determined by keeping the liquid level of the water model unchanged, so as to keep the water flow in the water model at a steady state.

S2.2) a high-speed camera is placed at a proper position in front of the water model, and simultaneously a white strong light source is placed at the side of the water model;

S2.3) the high-speed camera and the strong light source are turned on, the shooting area of the high-speed camera is adjusted to be the area of research concern, the shooting frame rate of the high-speed camera is set at 5 to 100 fps, and the strong light source is adjusted to completely illuminate the shooting area;

S2.4) ink is rapidly injected at the inlet of the water model, where the ink may be red ink, blue ink, black ink or potassium permanganate solution, and the volume of the injected ink is 10-200 mL;

S2.5) the flow and diffusion process of the ink in the water model tundish is shot by the high-speed camera, and the process that the aqueous solution in the water model changes from transparent to dye and then becomes transparent is observed, and the shooting end point is that the aqueous solution basically becomes transparent, and no obvious change is ensured within 30 s; and S2.6) the video file of ink tracing will be obtained by the above process.

The specific steps of S3) are as follows:

S3.1) images are extracted, pictures in the video file are extracted frame by frame, and each frame of the pictures is sequentially saved as an image, and sequentially named as Image_00001, Image_00002, Image_00003 . . . , and all the images are saved in an image folder Image_File;

S3.2) the research area is determined, because of the limitation of video shooting, the shot picture contains both the research area and the non-research area, processing the extracted first frame image in S3.1), painting the non-research area as pure white (that is, the RGB values are all 255), and the remaining area is taken as a research area, and positions of the research area and the non-research area are simultaneously read and recorded through a computer program;

S3.3) based on the position of the non-research area read in S3.2), all the images in the image folder Image_File are processed by a computer program, and the non-research areas of all the images are painted pure white (that is, the RGB values are all 255);

S3.4) the initial image is determined, the first image with ink is found at the inlet from front to back in the image folder Image_File, and renamed as Im_00001, the image before the Im_00001 is an initial image, and renamed as Im_00000, and images after Im_00001 are renamed as Im_00002, Im_00003 . . . , and remaining images are deleted;

S3.5) the background color is removed, an RGB value of the Im_00000 image is read through the computer program, RGB values of all the images in the image folder Image_File are used to subtract the RGB value of Im_00000 image to obtain new images, and all the new images are saved in the image folder Post_File, and named as Post_00000, Post_00001, Post_00002, post_00003 . . . in turn.

S3.6) the average grayscale value is calculated, based on a read research area position in S3.2), an average grayscale value of the research area of each image in the image folder Post_File are read and calculated in turn by the computer program, and saving in a Post_Gray array in turn; and S3.7) based on the shooting frame rate of the high-speed camera set in S2.3), the characteristic curve of the global average grayscale changing with the time is plotted, where an abscissa is the time, obtained by converting from the shooting frame rate of the high-speed camera, and an ordinate is a normalized grayscale value, obtained by dividing each value in the Post_Gray array by a maximum value in the Post_Gray array.

The specific steps of $4) are as follows:

S4.1) based on the characteristic curve of the global average grayscale changing with the time from S3.7), the first moment with the normalized grayscale value of 1.00 is found, meaning the time of the abscissa corresponding to the first time of 1.00 in the ordinate, and the time of the corresponding abscissa will be defined as the global peak grayscale time;

S4.2) based on the characteristic curve of the global average grayscale changing with the time from S3.7), the average grayscale value corresponding to 2 times of theoretical residence time is found, meaning the average grayscale value corresponding to 2 times the theoretical residence time in the abscissa, and the corresponding average grayscale value will be defined as the global tracer residual volume;

S4.3) based on the characteristic curve of the global average grayscale changing with the time from S3.7), the first moment with the normalized grayscale value of 0.05 is found, that is, the time of a corresponding abscissa when the ordinate is 0.05 for the first time, and the time of the corresponding abscissa will be defined as the global emptying time; and S4.4) the global peak grayscale time, the global tracer residual volume and the global emptying time are capable of being the indicators for evaluating the tundish structure and the flow characteristics of the tundish structure.

Embodiment 2

Figure 2:
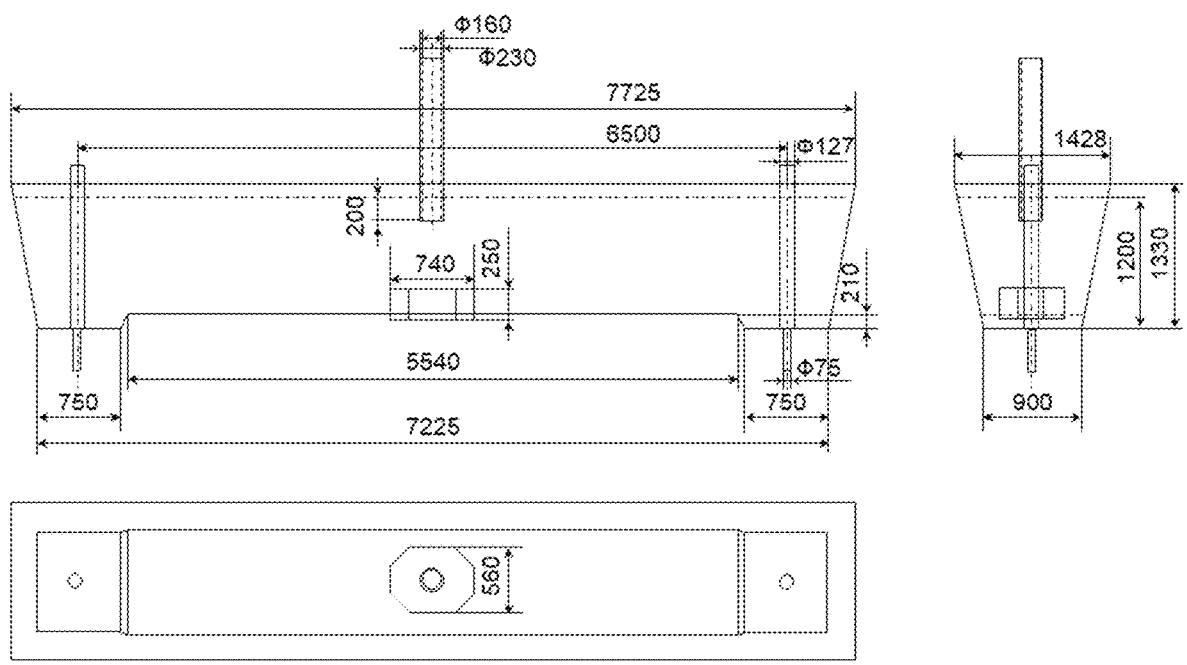
FIG. 2 shows the prototype size of the tundish studied in the Embodiment 2.

This embodiment takes a twin-strand tundish prototype with the capacity of 60 ton as the research object, in which there is no dam and baffle in the tundish, specifically including the following steps (as shown in FIG. 1):

S1) a water model is built based on the prototype size and production parameters;

S1.1) the tundish studied has a nominal capacity of 60 t, and the key dimensions are shown in FIG. 2, where the tundish is 7725 mm long, 1428 mm wide and 1330 mm deep, the inner diameter of the long nozzle is 160 mm, the outer diameter is 230 mm, the immersion depth is 1200 mm; the diameter of the tundish outlet is 75 mm, the diameter of the stopper rod is 127 mm, and the turbulence inhibitor is an octagonal structure with a length of 740 mm, a width of 560 mm and a depth of 250 mm. There is no dam and baffle, and the height of molten steel is 1200 mm at the steady casting state;

S1.2) the section size of continuous casting slab is 230× 1500 mm and the casting speed is 1.25 m/min, and the calculated flowrate of the molten steel at the outlet of prototype tundish is 25,875 L/h;

S1.3) according to the experimental conditions, the similarity ratio is determined to be 1/4, that is, the ratio of the water model to the prototype size is 1/4;

S1.4) a water model is built is built by reducing the prototype size obtained in S1.1) in equal proportion based on the similarity ratio of 1/4 determined in S1.3), and the water model will be made of transparent plexiglass;

S1.5) according to the similarity principle, when designing the water model of tundish, the Froude number of the water model and prototype are equal. According to the similarity ratio of 1/4 determined in S1.3), the flowrate of the molten steel at the outlet of the prototype tundish obtained in S1.2) is substituted into Froude number, and the water flowrate at the outlet of water model is 808.6 L/h, and the experiment takes 800 L/h;

S1.6) according to the size of the water model and the water flowrate at the outlet of the water model, the theoretical residence time of the water model is calculated to be 300 s.

S2) a water model experiment is carried out to obtain a video file of ink tracing;

S2.1) the water model experiment is carried out based on the water model built in S1). First, the outlet of the water model is closed, the inlet is opened, and colorless tap water is injected into the water model tundish. When the liquid level is approaching the liquid level corresponding to steady casting, the outlet of the water model tundish is opened and the water flowrate at the outlet is adjusted to the water flowrate obtained in S1.5); then, through feedback adjustment, the water flowrate at the inlet is determined by keeping the liquid level of the water model unchanged, so as to keep the water flow in the water model at a steady state.

S2.2) a high-speed camera is placed at a proper position in front of the water model, and simultaneously a white strong light source is placed at the side of the water model;

S2.3) the high-speed camera and the strong light source are turned on, and the shooting area of the high-speed camera is adjusted to the area of research. Because the tundish studied in this embodiment has a symmetrical structure, the shooting area is half of that of the water model tundish, the shooting frame rate of the high-speed camera is set to 10 fps, and the strong light source is adjusted to completely illuminate the shooting area;

S2.4) red ink is rapidly injected at the inlet of the water model, where the volume of the injected red ink is 20 mL;

S2.5) shot by a high-speed camera, and the process that the aqueous solution in the water model changes from transparent to dye and then becomes transparent is observed, and the shooting end point is that the aqueous solution basically becomes transparent, and no obvious change is ensured within 30 s, the shooting time of this embodiment is 1000 s; and S2.6) the video file of ink tracing will be obtained by the above process.

S3) the video file is processed and the characteristic curve of the global average grayscale changing with the time is extracted;

S3.1) images are extracted, pictures in the video file are extracted frame by frame, and each frame of the pictures is sequentially saved as an image, and sequentially named as Image_00001, Image_00002, Image_00003 . . . , and all the images are saved in an image folder Image_File;

S3.2) the research area is determined, because of the limitation of video shooting, the shot picture contains both the research area and the non-research area, processing the extracted first frame image in S3.1), painting the non-research area as pure white (that is, the RGB values are all 255), and the remaining area is taken as a research area, and positions of the research area and the non-research area are simultaneously read and recorded through a computer program;

S3.3) based on the position of the non-research area read in S3.2), all the images in the image folder Image_File are processed by a computer program, and the non-research areas of all the images are painted pure white (that is, the RGB values are all 255);

S3.4) the initial image is determined, the first image with ink is found at the inlet from front to back in the image folder Image_File, and renamed as Im_00001, the image before the Im_00001 is an initial image, and renamed as Im_00000, and images after Im_00001 are renamed as Im_00002, Im_00003 . . . , and remaining images are deleted;

S3.5) the background color is removed, an RGB value of the Im_00000 image is read through the computer program, RGB values of all the images in the image folder Image_File are used to subtract the RGB value of Im_00000 image to obtain new images, and all the new images are saved in the image folder Post_File, and named as Post_00000, Post_00001, Post_00002, post_00003 . . . in turn.

Figure 3:
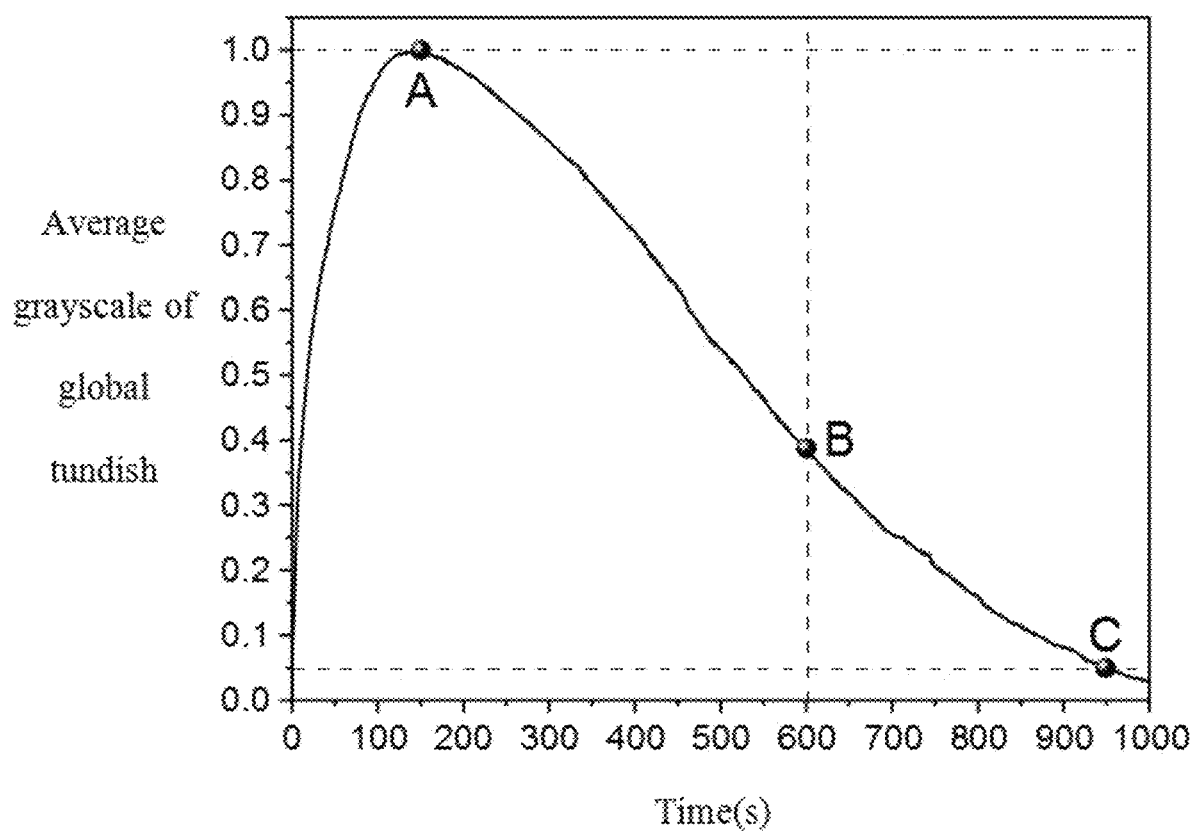
FIG. 3 is a characteristic curve of the global average grayscale changing with the time extracted in the Embodiment 2.

S3.6) the average grayscale value is calculated, based on a read research area position in S3.2), an average grayscale value of the research area of each image in the image folder Post_File are read and calculated in turn by the computer program, and saving in a Post_Gray array in turn; and S3.7) based on the shooting frame rate of the high-speed camera set in S2.3), the characteristic curve of the global average grayscale changing with the time is plotted, where an abscissa is the time, obtained by converting from the shooting frame rate of the high-speed camera, and an ordinate is a normalized grayscale value, obtained by dividing each value in the Post_Gray array by a maximum value in the Post_Gray array, as shown in FIG. 3.

S4) analyzing the characteristic curve, and extracting a global peak grayscale time, a global tracer residual volume and a global emptying time as indicators for evaluating a tundish structure and flow characteristics of the tundish structure.

S4.1) based on the characteristic curve of the global average grayscale changing with the time from S3.7), the first moment with the normalized grayscale value of 1.00 is found, meaning the time of the abscissa corresponding to the first time of 1.00 in the ordinate, and the time of the corresponding abscissa will be defined as the global peak grayscale time; according to point A in FIG. 3, the global peak grayscale time of this embodiment is 150 s;

S4.2) based on the characteristic curve of the global average grayscale changing with the time from S3.7), the average grayscale value corresponding to 2 times of theoretical residence time is found, meaning the average grayscale value corresponding to 2 times the theoretical residence time in the abscissa, and the corresponding average grayscale value will be defined as the global tracer residual volume; it can be obtained from point B in FIG. 3 that in this embodiment, the global tracer residual volume is 0.388;

S4.3) based on the characteristic curve of the global average grayscale changing with the time from S3.7), the first moment with the normalized grayscale value of 0.05 is found, that is, the time of a corresponding abscissa when the ordinate is 0.05 for the first time, and the time of the corresponding abscissa will be defined as the global emptying time; it can be obtained from point C in FIG. 3 that in this embodiment, the global emptying time is 949 s; and S4.4) the global peak grayscale time, the global tracer residual volume and the global emptying time are capable of being the indicators for evaluating the tundish structure and the flow characteristics of the tundish structure.

Embodiment 3

The application also provides a system for analyzing global average grayscale change of tundish ink tracing experiment, including a model building module, a video file obtaining module, a characteristic curve extracting module and an evaluation indicator extracting module the model building module is used for building a water model based on a prototype size and production parameters of a tundish;

the video file obtaining module is used for carrying out experiments by using the water model to obtain a video file of the ink tracing;

the characteristic curve extracting module is used for processing the video file and extracting a characteristic curve of the global average grayscale changing with the time; and the evaluation indicator extracting module is used for analyzing the characteristic curve and extracting a global peak grayscale time, a global tracer residual volume and a global emptying time as indicators for evaluating a tundish structure and flow characteristics of the tundish structure In this embodiment, a process of building the water model based on the prototype size and the production parameters of the tundish includes:

obtaining a nominal capacity of the tundish, and measuring or designing the prototype size of the tundish based on the nominal capacity;

determining a similarity ratio between the water model and the prototype according to experimental conditions; and reducing the prototype size in equal proportion based on the similarity ratio, and building the water model based on a reduced prototype size.

In this embodiment, a process of carrying out the experiments by using the water model to obtain the video file of the ink tracing includes:

adjusting the water flowrate at an inlet and an outlet of the water model to make the flow in the water model in a stable state;

placing the high-speed camera at a proper position in front of the water model, and placing a white strong light source at a side of the water model;

turning on the high-speed camera and the white strong light source, adjusting a shoot area and the shooting frame rate of the high-speed camera, and adjusting the white strong light source so that the white strong light source completely illuminates the shoot area;

quickly injecting ink with a preset volume at the inlet of the water model; and using the high-speed camera to shoot the flow and diffusion process of the ink in the water model to obtain the video file of the ink tracing.

In this embodiment, a process of processing the video file and extracting the characteristic curve of the global average grayscale changing with the time includes:

extracting pictures in the video file frame by frame, and sequentially saving each frame of the pictures as an image, and sequentially named as Image_00001, Image_00002, Image_00003 . . . , and all the images are saved in an image folder Image_File;

processing the extracted first frame image, painting a non-research area as pure white, and taking the remaining area as a research area, and simultaneously reading and recording positions of the research area and the non-research area through a computer program;

based on the read position of the non-research area, processing all the images in the image folder Image_File by the computer program, and painting the non-research areas of all the images pure white;

finding the first image with ink at the inlet from front to back in the image folder Image_File, and renamed as Im_00001, the image before the Im_00001 is an initial image, and renamed as Im_00000, and renaming images after Im_00001 as Im_00002, Im_00003 . . . , and deleting remaining images;

reading the RGB value of the Im_00000 image through the computer program, using RGB values of all the images in the image folder Image_File to subtract the RGB value of Im_00000 image to obtain new images, and saving all the new images in the image folder Post_File, being named as Post_00000, Post_00001, Post_00002, post_00003 . . . in turn;

based on the read position of the research area, reading and calculating the average grayscale value of the research area of each image in the image folder Post_File in turn by the computer program, and saving the average grayscale value in a Post_Gray array in turn;

based on the shooting frame rate of a high-speed camera, creating the characteristic curve of the global average grayscale changing with the time, where an abscissa is the time, obtained by converting from the shooting frame rate of the high-speed camera, and an ordinate is a normalized grayscale value, obtained by dividing each value in the Post_Gray array by a maximum value in the Post_Gray array.

In this embodiment, a process for analyzing the characteristic curve, and extracting the global peak grayscale time, the global tracer residual volume and the global emptying time as the indicators for evaluating the tundish structure and the flow characteristics of the tundish structure, including:

based on the characteristic curve of the global average grayscale changing with the time, obtaining the first moment with the normalized grayscale value of 1.00, meaning the time of the abscissa corresponding to the first time of 1.00 in the ordinate, and defining the time of the corresponding abscissa as the global peak grayscale time;

based on the characteristic curve of the global average grayscale changing with the time, obtaining the average grayscale value corresponding to 2 times of theoretical residence time, meaning the average gray value corresponding to 2 times the theoretical residence time in the abscissa, and defining the corresponding average grayscale value as the global tracer residual volume;

based on the characteristic curve of the global average grayscale changing with the time, obtaining the first moment with the normalized grayscale value of 0.05, meaning the time of the abscissa corresponding to the first time of 0.05 in the ordinate, and defining the time corresponding to the abscissa as the global emptying time; and using the global peak grayscale time, the global tracer residual volume and the global emptying time as the indicators for evaluating the tundish structure and the flow characteristics of the tundish structure.

The above-mentioned embodiment is only a description of the preferred mode of the application, and does not limit the scope of the application. Under the premise of not departing from the design spirit of the application, various modifications and improvements made by ordinary technicians in the field to the technical scheme of the application shall fall within the protection scope determined by the claims of the application.

What is claimed is:

1. A method for analyzing global average grayscale change of tundish ink tracing experiment, comprising following steps:

building a water model based on a prototype size and production parameters of a tundish;

carrying out experiments by using the water model to obtain a video file of an ink tracing;

processing the video file and extracting a characteristic curve of a global average grayscale changing with time;

wherein a method for processing the video file and extracting the characteristic curve of the global average grayscale changing with the time comprises:

extracting pictures in the video file frame by frame, and sequentially saving each frame of the pictures as an image, and sequentially named as Image_00001, Image_00002, Image_00003 . . . , and all images are saved in an image folder Image_File;

processing an extracted first frame image, painting a non-research area as pure white, and taking a remaining area as a research area, and simultaneously reading and recording positions of the research area and the non-research area through a computer program;

based on a read position of the non-research area, processing all the images in the image folder Image_File by the computer program, and painting each non-research area of all the images pure white;

finding a first image with ink at an inlet from front to back in the image folder Image_File, and renamed as Im_00001, an image before the Im_00001 is an initial image, and renamed as Im_00000, and sequentially renaming images after Im_00001 as Im_00002, Im_00003 . . . , and deleting remaining images;

reading an RGB value of the Im_00000 through the computer program, using RGB values of all the images in the image folder Image_File to subtract the RGB value of Im_00000 image to obtain new images, and saving all the new images in an image folder Post_File, being named as Post_00000, Post_00001, Post_00002, post_00003 . . . in turn;

based on a read position of the research area, reading and calculating an average grayscale value of a research area of each image in the image folder Post_File in turn by the computer program, and saving the average grayscale value in a Post_Gray array in turn;

based on a shooting frame rate of a high-speed camera, creating the characteristic curve of the global average grayscale changing with the time, wherein an abscissa is the time, obtained by converting from the shooting frame rate of the high-speed camera, and an ordinate is a normalized grayscale value, obtained by dividing each value in the Post_Gray array by a maximum value in the Post_Gray array;

analyzing the characteristic curve, and extracting a global peak grayscale time, a global tracer residual volume and a global emptying time as indicators for evaluating a tundish structure and flow characteristics of the tundish structure;

wherein a method for analyzing the characteristic curve, and extracting the global peak grayscale time, the global tracer residual volume and the global emptying time as the indicators for evaluating the tundish structure and the flow characteristics of the tundish structure comprises:

based on the characteristic curve of the global average grayscale changing with the time, obtaining a first moment with a normalized grayscale value of 1.00, meaning a time of the abscissa corresponding to a first time of 1.00 in the ordinate, and defining the time of the corresponding abscissa as the global peak grayscale time;

based on the characteristic curve of the global average grayscale changing with the time, obtaining an average grayscale value corresponding to 2 times of theoretical residence time, meaning an average grayscale value corresponding to 2 times the theoretical residence time in the abscissa, and defining the corresponding average grayscale value as the global tracer residual volume;

based on the characteristic curve of the global average grayscale changing with the time, obtaining a first moment with a normalized grayscale value of 0.05, meaning a time of the abscissa corresponding to a first time of 0.05 in the ordinate, and defining the time corresponding to the abscissa as the global emptying time; and using the global peak grayscale time, the global tracer residual volume and the global emptying time as the indicators for evaluating the tundish structure and the flow characteristics of the tundish structure.

2. The method for analyzing the global average grayscale change of the tundish ink tracing experiment according to claim 1, wherein a method for building the water model based on the prototype size and the production parameters of the tundish comprises:

obtaining a nominal capacity of the tundish, and measuring or designing the prototype size of the tundish based on the nominal capacity;

determining a similarity ratio between the water model and the prototype according to experimental conditions; and reducing the prototype size in equal proportion based on the similarity ratio, and building the water model based on a reduced prototype size.

3. The method for analyzing the global average grayscale change of the tundish ink tracing experiment according to claim 1, wherein a method for carrying out the experiments by using the water model to obtain the video file of the ink tracing comprises:

adjusting a water flowrate at an inlet and an outlet of the water model to make a flow in the water model in a stable state;

placing the high-speed camera at a proper position in front of the water model, and placing a white strong light source at a side of the water model;

turning on the high-speed camera and the white strong light source, adjusting a shoot area and the shooting frame rate of the high-speed camera, and adjusting the white strong light source to make the white strong light source completely illuminate the shoot area;

quickly injecting ink with a preset volume at the inlet of the water model; and using the high-speed camera to shoot a flow and diffusion process of the ink in the water model to obtain the video file of the ink tracing.

* * * * *